United States Patent
Humbert et al.

(10) Patent No.: US 10,757,563 B1
(45) Date of Patent: Aug. 25, 2020

(54) METHOD AND SYSTEM FOR CONTROLLING UE OPERATION BASED ON TDD CONFIGURATION SUPPORT PER LOCATION

(71) Applicant: Sprint Spectrum L.P., Overland Park, KS (US)

(72) Inventors: John J. Humbert, Overland Park, KS (US); Mike Witherell, Portland, OR (US); Scott Migaldi, Cary, IL (US); George Cummings, Gilbert, AZ (US); Nick J. Baustert, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 480 days.

(21) Appl. No.: 15/208,154

(22) Filed: Jul. 12, 2016

(51) Int. Cl.
  *H04W 8/08* (2009.01)
  *H04L 5/14* (2006.01)
  *H04W 64/00* (2009.01)

(52) U.S. Cl.
  CPC .............. *H04W 8/08* (2013.01); *H04L 5/14* (2013.01); *H04W 64/00* (2013.01)

(58) Field of Classification Search
  CPC ........................... H04W 72/04; H04J 3/1694
  USPC ................................................ 370/328–339
  See application file for complete search history.

(56) References Cited

U.S. PATENT DOCUMENTS

| | | | | |
|---|---|---|---|---|
| 2013/0308568 | A1* | 11/2013 | Chen | H04W 72/0406 370/329 |
| 2013/0322378 | A1* | 12/2013 | Guan | H04W 72/1289 370/329 |
| 2014/0341094 | A1* | 11/2014 | Yang | H04L 1/1854 370/280 |
| 2015/0304087 | A1* | 10/2015 | He | H04L 5/0007 370/280 |
| 2016/0270012 | A1* | 9/2016 | Chen | H04W 76/10 |

\* cited by examiner

*Primary Examiner* — Iqbal Zaidi

(57) ABSTRACT

A method and system to help address this issue. When a device is within coverage of a cell that operates with a particular TDD configuration, the device will determine based on its location a set of one or more TDD frame configurations that the device would support, which could be based on maximum uplink transmission power of the UE, permitted maximum transmission power in the location, and uplink duty cycle defined by each of the various TDD configurations. The UE will then control whether or not it will be served by the cell based on whether the TDD configuration of the cell is within the determined set.

20 Claims, 5 Drawing Sheets

| TDD Configuration | Subframe Number (0-9) | | | | | | | | | | Uplink Subframes |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 6 |
| 1 | D | S | U | U | D | D | S | U | U | D | 4 |
| 2 | D | S | U | D | D | D | S | U | D | D | 2 |
| 3 | D | S | U | U | U | D | D | D | D | D | 3 |
| 4 | D | S | U | U | D | D | D | D | D | D | 2 |
| 5 | D | S | U | D | D | D | D | D | D | D | 1 |
| 6 | D | S | U | U | U | D | S | U | U | D | 5 |

METHOD AND SYSTEM FOR CONTROLLING UE OPERATION BASED ON TDD CONFIGURATION SUPPORT PER LOCATION

BACKGROUND

A typical wireless communication system includes one or more base stations, each radiating to define one or more cells in which user equipment devices (UEs) such as cell phones, tablet computers, tracking devices, embedded wireless modules, and other wirelessly equipped devices (whether or not user-operated) can operate. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular air interface protocol or radio access technology (RAT), with communications from a base station to UEs defining a downlink or forward link and communications from the UEs to the base station defining an uplink or reverse link. Examples of existing air interface protocols include, without limitation, Long Term Evolution (LTE) (using Orthogonal Frequency Division Multiple Access (OFDMA) on the downlink), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handover between cells, and other functions related to air interface communication.

In accordance with the air interface protocol, each of the one or more cells of such a system may operate on a respective carrier, which could be frequency division duplex (FDD) or time division duplex (TDD), defining one or more frequency channels each typically within an industry standard frequency band. An FDD carrier defines separate frequency channels for downlink and uplink communication, so that UEs can engage in downlink and uplink communication. Whereas, a TDD carrier defines a frequency channel multiplexed over time (e.g., on a recurring basis) between downlink and uplink use, so that UEs can engage in downlink communication in only particular time intervals and uplink communication in only other time intervals.

Each carrier in such a system may also define a number of sub-channels for carrying information between the base station and UEs. For instance, each carrier may define a pilot channel, reference channel or other resource on which the base station can broadcast a pilot signal, reference signal, or the like that UEs may detect as an indication of coverage and may measure to evaluate coverage. Further, each carrier may define a downlink control channel for carrying scheduling directives and other control signaling from the base station to UEs, and an uplink control channel for carrying service requests and other control signaling from UEs to the base station, and each carrier may define downlink and uplink traffic channels or the like for carrying bearer traffic between the base station and UEs.

When a UE initially enters into coverage of a wireless communication system (e.g., powers on in coverage of the system), the UE may scan for a strongest (e.g., highest signal-to-noise ratio) reference signal, defining a strongest cell. Further, the UE may read system information broadcast from the base station in that cell and may engage in a process to register itself to be served by the base station's cell and generally by the system.

In an example process, for instance, the UE and base station may first engage in signaling to establish a radio-link-layer connection between the UE and the base station, the UE may then transmit an attach, registration, or association request message on an uplink control channel of the cell, and the base station and/or supporting infrastructure may then authenticate and authorize the UE for service, establish a record indicating where in the system the UE is operating, establish local profile or context records for the UE, and provide an attach accept message to the UE. The UE may then be served by the base station's cell in an idle mode or a connected mode.

Further, while a UE is served by a base station's cell, the UE may also monitor the signal strength of that cell and of other cells in an effort to ensure that the UE continues to operate in a best (e.g., strongest) cell. If the UE detects that its serving cell becomes threshold weak and/or that another cell is threshold strong (e.g., threshold stronger than the serving cell), then the UE may hand over from being served by its current cell to being served by the other cell. For instance, the UE may transmit to its serving base station a measurement report indicating the other detected cell, and the base station and/or supporting network infrastructure may responsively process handover of the UE from the serving cell to the other cell. Alternatively, the UE may engage in idle handover by itself to the other cell and possibly transmit a location area update or tracking area update to the network to notify the network where the UE is now operating.

OVERVIEW

Regulations in particular locations may limit the average uplink transmission power from a UE, with the average uplink transmission power being defined based on the UE's output power level and based on the UE's duty cycle, i.e., how often the UE's uplink transmission is active. For instance, governments in certain countries may restrict UEs to operating at no greater than a particular average uplink transmission power. In such a country, when the UE transmits continuously, the UE's transmission power should thus be no greater than the maximum allowed average uplink transmission power. Whereas, if the UE continuously alternates equal amounts of time (e.g., per millisecond) between transmitting and not transmitting, then the UE's actual transmission power could in theory be twice the maximum allowed average uplink transmission power, since the UE's average uplink transmission power would be half of its actual transmission power.

In general, a UE may be configured with a power amplifier and/or associated logic that supports a specified maximum actual uplink transmission power level, i.e., a highest power level at which the UE is capable of transmitting, regardless of duty cycle. Particular models of UEs may have different such maximum actual uplink transmission power levels, defined by UE manufacturers, vendors, service providers, or the like. In operation, it is at least theoretically possible that such a UE will transmit at its actual maximum uplink transmission power level.

Various TDD cells throughout a region may also be configured with respective downlink-uplink frame configurations, defining how often uplink communication can occur and how often downlink communication can occur. For instance, a representative TDD cell might define a continuum of 10-millisecond frames, each divided into ten 1-millisecond subframes, and the TDD cell may have a particular TDD configuration (i.e., frame configuration, subframe configuration, or downlink-uplink configuration) defining which subframes are for downlink communication and which subframes are for uplink communication. (In some cases, special subframes for transition between downlink and uplink operation could be provided as well.) The TDD configuration of a given cell thus effectively defines a theoretical maximum duty cycle at which a UE served by the cell could engage in uplink transmission.

Assuming that a UE may at times use its configured maximum uplink transmission power, and given the relationships between transmission power, duty cycle, and maximum average uplink transmission allowed per location, it may be advantageous to prevent the UE from being served with certain TDD configurations in certain locations.

For example, if a UE's maximum uplink transmission power is twice the maximum allowed average uplink transmission power in a given location (e.g., a given country), then it may be advantageous to prevent the UE from being served by any TDD cell in that location that is configured with uplink communication occurring more than half the time. For instance, it may be acceptable in that situation to have the UE be served by a TDD cell in which every other subframe is uplink, as the UE could operate with its configured maximum uplink transmission power in every uplink subframe of such a cell and its average uplink transmission power would still be no greater than then maximum allowed average uplink transmission power for the location. Whereas, it may be unacceptable in that situation to have the UE be served by a TDD cell in which two of every three subframes is uplink, as the UE's average uplink transmission power in such a cell could then in theory be greater than the maximum allowed average uplink transmission power for the location.

Disclosed herein is a method and system to help address this issue. In accordance with the disclosure, when a UE is within coverage of a cell that operates with a particular TDD configuration, the UE will determine based on its geographic location a set of one or more TDD frame configurations that the UE would support, in line with the analysis above, and the UE will then control whether or not it will be served by the cell based on whether the TDD configuration of the cell is within the determined set. For instance, if the UE thereby determines that the TDD configuration of the cell is not one that the UE supports given the UE's current geographic location, then the UE may responsively forgo being served by the cell (e.g., discontinue being served by the cell or avoid initially being served by the cell) and perhaps instead seek service by another cell or forgo service altogether (e.g., power off or otherwise avoid being served). Whereas, if the UE thereby determines that the TDD configuration of the cell is one that the UE supports given the UE's current geographic location, then the UE may responsively be served by the cell.

Further, disclosed herein is a UE configured to carry out such functionality. And disclosed is a method including provisioning a UE with data to facilitate such functionality and configuring the UE to carry out such functionality. In line with the disclosure, for instance, the data could correlate each of various geographic locations with a respective set of one or more TDD configurations supported by the UE in the geographic location, with the data being based on uplink transmission power of the UE and uplink transmission power permitted in the location. And the UE could be configured to use the data as a basis (i) to determine, based on its current geographic location, a set of one or more TDD configurations supported by the UE, (ii) to determine a TDD configuration of a base station's cell in whose coverage the UE is positioned, and (iii) to control whether the UE will be served by the cell, based on whether the determined TDD configuration of the cell is within the determined set of one or more TDD configurations supported by the UE.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 2 is a depiction of example TDD configurations.

DETAILED DESCRIPTION

Figure 1:
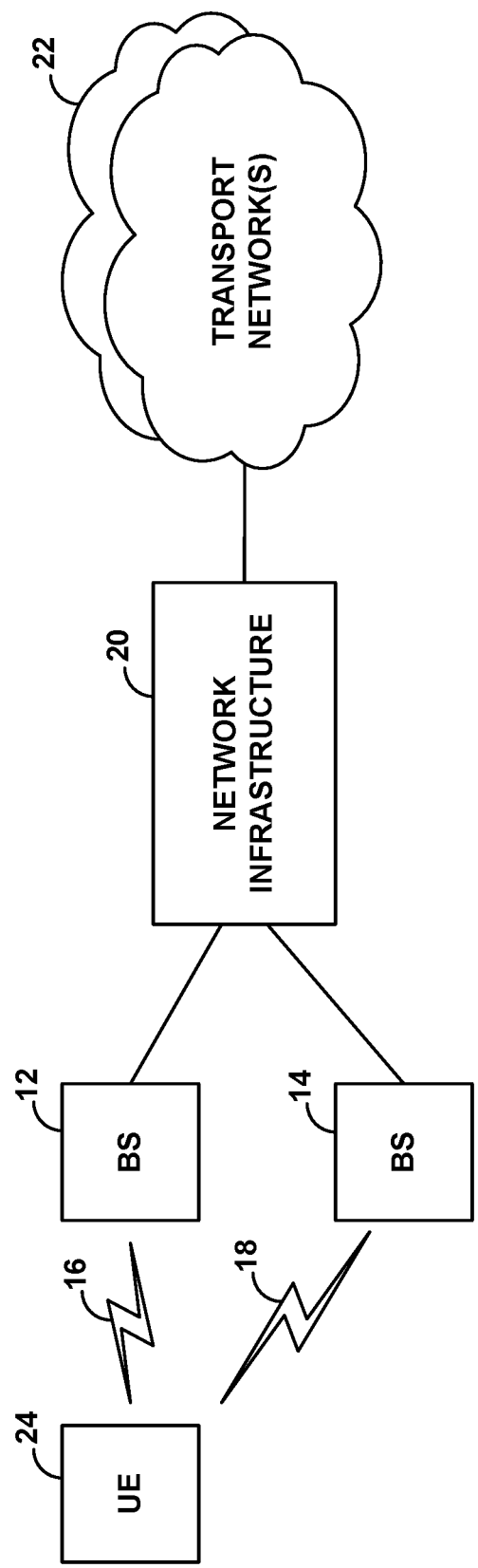
FIG. 1 is a simplified block diagram of an example wireless communication system in which features of the present disclosure can be implemented.

Referring to the drawings, as noted above, FIG. 1 is a simplified block diagram of an example wireless communication system in which features of the present disclosure can be implemented. The system of FIG. 1 includes two representative base stations 12, 14, each providing a respective cell 16, 18 in which to serve UEs. The two representative base stations are then further shown coupled with network infrastructure 20 (including, for instance, switches, gateways, controllers, and the like), providing connectivity with one or more transport networks 22, such as the PSTN or the Internet. Further shown in the figure is then a representative UE 24 within coverage of cell 16 and also within coverage of cell 18.

In this arrangement, we can assume that cells 16 and 18 are both TDD cells, and that they operate with different TDD configurations than each other. (In practice, if cells 16 and 18 are overlapping as the figure suggests, then they would likely not operate with different TDD configurations than each other unless they operate on different carriers, as two different TDD frame configurations on the same carrier at the same coverage location could result in downlink transmission in one cell interfering with uplink reception in the other cell. That said, procedures could be in place to accommodate that situation as well.)

Absent the presently disclosed method, when UE 24 is within coverage of cells 16 and 18 as shown and is seeking to determine which cell to be served by (e.g., initially or for possible handover), the UE may detect reference signals from both cells and may evaluate the reference signals to determine which cell to be served by based on which cell provides the stronger (e.g., higher signal-to-noise ratio) signal. The presently disclosed method, however, provides a further or alternate basis for the UE to decide whether or not to be served by a cell, such as by the strongest detected cell.

Assuming the UE detects a strongest signal from cell 16, the UE may then carry out the present method to control whether or not to be served by cell 16 (e.g., whether or not to register for service in cell 16 or, if already registered for service there, whether or not to stay served by cell 16). In particular, the UE may determine its current geographic location and, based on its geographic location, a set of one or more TDD configurations supported by the UE. Further, the UE may determine the TDD configuration of cell 16, based on a broadcast message from cell 16 for instance. And the UE may then control whether to be served by cell 16 based on whether the determined TDD configuration of cell 16 is within the determined set of one or more TDD configurations. If the determined configuration of cell 16 is within the determined set of one or more TDD configurations that the UE supports based on its current location, then, assuming any other pertinent considerations are met, the UE may responsively be served by cell 16. Whereas, if the determined configuration of cell 16 is not within the determined set of one or more TDD configurations that the UE supports based on its current location, then the UE may forgo being served by cell 16, possibly instead opting to be served by second-best cell 18 or not being served by a cell at all.

As a specific example of this process, consider a scenario where the two illustrated base stations 12, 14, are LTE base stations (evolved Node-B's (eNodeBs)), each providing TDD LTE service. Each such base station could take various forms, such as a macro base station (typically tower mounted and providing widespread coverage) or a small cell, femtocell, or repeater (typically having a smaller form factor and providing more narrow coverage).

In accordance with an implementation of LTE, a TDD cell can be configured to operate with any of the standard TDD configurations shown in FIG. 2. In particular, the TDD LTE air interface defines a continuum of 10-millisecond subframes each including ten 1-millisecond subframes as discussed above. And each of the subframes can then be designated as either a downlink subframe (D), and uplink subframe (U), or a special subframe (S). A downlink subframe is reserved for downlink use, an uplink subframe is reserved for uplink use, and a special subframe may serve to provide transition from downlink to uplink, possibly having a starting portion be for downlink use, a guard period with no use, and then an ending portion be for uplink use.

An eNodeB that provides a cell with any such TDD configuration may broadcast a system information message that specifies the cell's TDD configuration, and a UE within coverage of the eNodeB could determine the cell's TDD configuration based on that broadcast message. For instance, an eNodeB typically broadcasts certain System Information Block (SIB) messages in subframe 0 of each frame and, for a TDD cell, the eNodeB typically includes a specification of its TDD configuration (e.g., a TDD configuration number) in such a SIB message. Thus, a UE that is within coverage of such a cell could read that SIB message to determine the TDD configuration of the cell. Alternatively, a UE could in theory determine the TDD configuration of a cell in other ways, such as by monitoring to determine the subframes in which the eNodeB transmits per frame.

In addition, each LTE eNodeB may broadcast in its cell an indication of the geographic location of the eNodeB, and a UE within coverage of the eNodeB could determine the UE's geographic location based on that broadcast. By way of example, the eNodeB may include in one of its SIB messages a mobile country code (MCC) that indicates the country in which the eNodeB operates. (MCCs 310-316, for instance, indicate operation in the United States. Whereas MCC 302 indicates operation in Canada, and MCC 334 indicates operation in Mexico.) Thus, UEs that is within coverage of such a cell could read that SIB message to determine the MCC as a representation of the UE's geographic location (e.g., country in which the UE is located). (Of course there could be some border situations that would raise other issues not addressed here.) Alternatively, a UE could in theory determine its geographic location in other ways, such as by reading a more specific indication of geographic location broadcast by the eNodeB or application of Global Positioning System (GPS) or other location determination processes.

In such an arrangement, a UE could be provisioned with various reference data and associated logic (e.g., program logic executable by one or more processing units of the UE) to carry out features of the present disclosure.

By way of example, the UE may be provisioned with correlation data, such as a data table, that maps between (i) MCC, as an example of geographic location, and (ii) TDD configuration(s) allowed for the UE in the associated country. Such correlation data may be specific to the UE, taking into account the UE's configured maximum uplink transmission power and the maximum allowable average uplink transmission power for the country at issue, with the analysis discussed above.

For instance, if the UE's configured maximum uplink transmission power is twice the maximum allowable average uplink transmission power a country having a particular MCC, then in theory the UE could support operation with a TDD configuration in no more than five of the 10 subframes per frame are uplink subframes, to ensure that the UE's average uplink transmission power does not exceed the maximum allowable average uplink transmission power in that country. Thus, with the TDD configurations shown in FIG. 1 (and accounting for the partial use of special subframes for uplink communication), TDD configurations 1-5 could be suitable, but TDD configurations 0 and 6 could be unsuitable. Given this, the UE's correlation data mapping for the MCC of that country could specify that the UE's supports TDD configurations 1-5 and/or could specify that the UE does not support TDD configurations 0 and 6 for that MCC. (Putting aside consideration of the partial use of special subframes for uplink communication, TDD configuration 6 could in theory be suitable as well.)

Whereas, if the UEs' configured maximum uplink transmission power is some other integer or non-integer multiple of the maximum allowable average uplink transmission power for the country at issue, the set of one or more TDD configurations could differ from these, and the correlation data could specify a different set of one or more supported TDD configurations for the MCC.

Further, different UEs could be provisioned with different such correlation data on grounds that the UEs have different configured maximum uplink transmission power than each other. A UE that has higher configured maximum uplink transmission power may thus support fewer TDD configurations (e.g., one or more having fewer uplink subframes) than a UE that has a lower configured maximum uplink transmission power, depending of course on the full analysis discussed above.

In practice, there may also be different maximum allowed average uplink transmission power for different frequency bands in each country or other location. To account for this, the UE's correlation data could specify for each MCC a set of one or more supported TDD configurations for each of multiple respective frequency bands, designated by band identifiers for instance, possibly with the UE correlating frequency to frequency band identifier or the UE determining the frequency band from a frequency band identifier broadcast by the base station in the cell. Here, the analysis could be the same as that described above, but the set of supported TDD configuration(s) per MCC could differ per frequency band on grounds that different maximum average uplink transmission power is permitted per frequency band in the associated country.

In a specific implementation, the UE could be provisioned with multiple related data tables to provide the correlations between MCC and supported TDD configuration(s) for the UE. For instance, the UE could be provisioned with one data table that correlates each of various MCCs (possibly some for the same country, but some for different countries than each other) with maximum allowed average uplink transmission power per MCC, and possibly further specifying for each MCC an allowed average uplink transmission power respectively for each of various frequency bands. Further, the UE could be provisioned with another data table, specific to the UE, that correlates each of various maximum allowed average uplink transmission powers with a respective set of one or more TDD configurations that the UE would support, in view of the UE's configured maximum uplink transmission power.

The specification of supported TDD configuration(s) in such data could take various forms, an example of which is a six-bit string in which each bit represents one of the six standard TDD configurations shown in FIG. 2 and constitutes a Boolean indication of whether the TDD configuration is supported by the UE.

Figure 3:
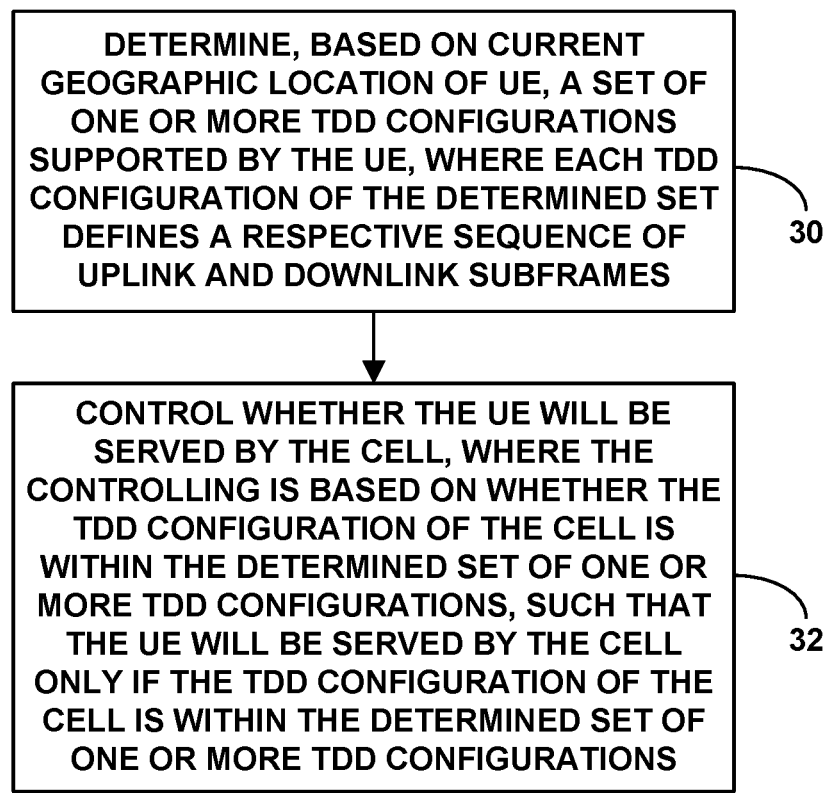
FIG. 3 is a flow chart depicting operations that can be carried out in accordance with the disclosure.

FIG. 3 is next a flow chart depicting an example method for controlling operation of a UE when the UE is within coverage of a base station's cell, where the cell operates with a TDD configuration defining a specific sequence of uplink and downlink subframes (such as one of the TDD configurations shown in FIG. 2 for instance, where subframes could be those show or could take other forms). As shown in FIG. 3, at block 30, the method includes the UE determining, based on current geographic location of the UE, a set of one or more TDD configurations supported by the UE, where each TDD configuration of the determined set defines a respective sequence of uplink and downlink subframes (again, such as those in FIG. 2 for instance). And at block 32, the method includes the UE controlling whether the UE will be served by the cell, where the controlling is based on whether the TDD configuration of the cell is within the determined set of one or more TDD configurations, such that the UE will be served by the cell (e.g., will attach in the cell or stay attached in the cell) only if the TDD configuration of the cell is within the determined set of one or more TDD configurations.

In line with the discussion above, the UE in such a method could be provisioned with data that correlates each of various geographic locations with a respective set of one or more TDD configurations supported by the UE, in which case the act of determining the set of one or more TDD configurations supported by the UE based on the current geographic location of the UE is based on reference to the data.

Further, the method could additionally involve the UE determining the current geographic location of the UE, in which case the act of determining the set of one or more TDD configurations supported by the UE could be based on the determined current geographic location of the UE. And as discussed above, the determined current geographic location of the UE could comprise a country, the base station could broadcast in the cell an MCC indicating the country, and the act of determining the current geographic location could involve reading the MCC broadcast by the base station in the cell, as an indication of the country and thus of the geographic location.

In addition, in line with the discussion above, the cell could operate in a frequency band (i.e., on a frequency channel that is within a frequency band), and the act of determining the set of one or more TDD configurations supported by the UE could be based further on the frequency band in which cell operates. In that case, for example, the UE could be provisioned with data that specifies, respectively for each of various locations, a set of one or more TDD configurations supported by the UE respectively for each of one or more frequency bands, and the act of determining the set of one or more TDD configurations supported by the UE based on the current geographic location of the UE and based further on the frequency band in which the cell operates could be based on reference to the data.

Still further, as discussed above, the base station could broadcast in the cell an indication of the TDD configuration of the cell, in which case the method could further include the UE determining the TDD configuration of the cell by reading the broadcast indication of the TDD configuration of the cell.

And in line with the discussion above, the act of controlling whether the UE will be served by the cell, based on whether the TDD configuration of the cell is within the determined set of one or more TDD configurations, could involve, responsive to the TDD configuration of the cell not being within the determined set of one or more TDD configurations, forgoing being served by the cell. For instance, the UE could determine that the TDD configuration of the cell is now within the determined set of one or more TDD configurations, and, responsive to determining that the TDD configuration of the cell is not within the determined set of one or more TDD configurations, the UE could forgo being served by the cell and could instead opt to be served by another cell instead. As discussed above, this could involve the UE then opting to be served instead by a next strongest or otherwise next best cell, or perhaps forgoing service altogether.

Figure 4:
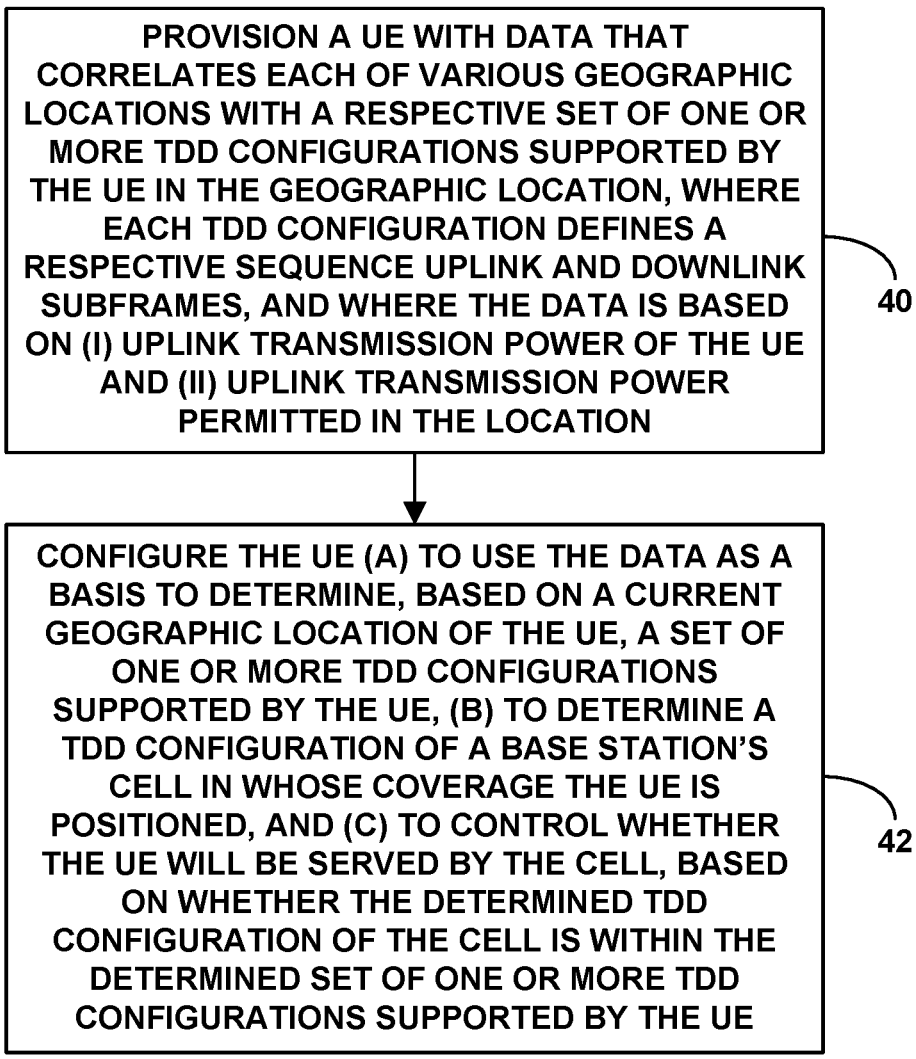
FIG. 4 is another flow chart depicting operations that can be carried out in accordance with the disclosure.

FIG. 4 is next a flow chart depicting another example method that can be carried out in accordance with the present disclosure. As shown in FIG. 4, at block 40, the method includes provisioning a UE with data that correlates each of various geographic locations with a respective set of one or more TDD configurations supported by the UE in the geographic location, where each TDD configuration defines a respective sequence uplink and downlink subframes, and where the data is based on (i) uplink transmission power of the UE and (ii) uplink transmission power permitted in the location. And at block 42, the method involves configuring the UE (a) to use the data as a basis to determine, based on a current geographic location of the UE, a set of one or more TDD configurations supported by the UE, (b) to determine a TDD configuration of a base station's cell in whose coverage the UE is positioned, and (c) to control whether the UE will be served by the cell, based on whether the determined TDD configuration of the cell is within the determined set of one or more TDD configurations supported by the UE.

The UE could be so provisioned and configured at the time of manufacture or initial distribution (e.g., by a service provider or other vendor) and/or at another time through over-the-air provisioning for instance. Although the figure shows the provisioning and configuring being done as sequential steps, those operations could be carried out in reverse order or concurrently.

The data correlating the geographic locations with TDD configurations could be established in line with the analysis discussed above, taking into account the configured maximum uplink transmission power of the UE and the maximum allowed average uplink transmission power per the location, and taking into account which TDD configurations would allow compliance with the transmission power restrictions assuming maximum power transmission by the UE in each uplink subframe for instance. (Note also that this data could be revised dynamically, by the UE or in some other manner, in response to a change in the UE's configured maximum uplink transmission power and/or in response to determining that the UE transmits at no more than some other power level.) Further, the configuring of the UE could involve programming the UE with machine language instructions executable by the UE to cause the UE to carry out the using, determining, and controlling operations, among various other operations.

Figure 5:
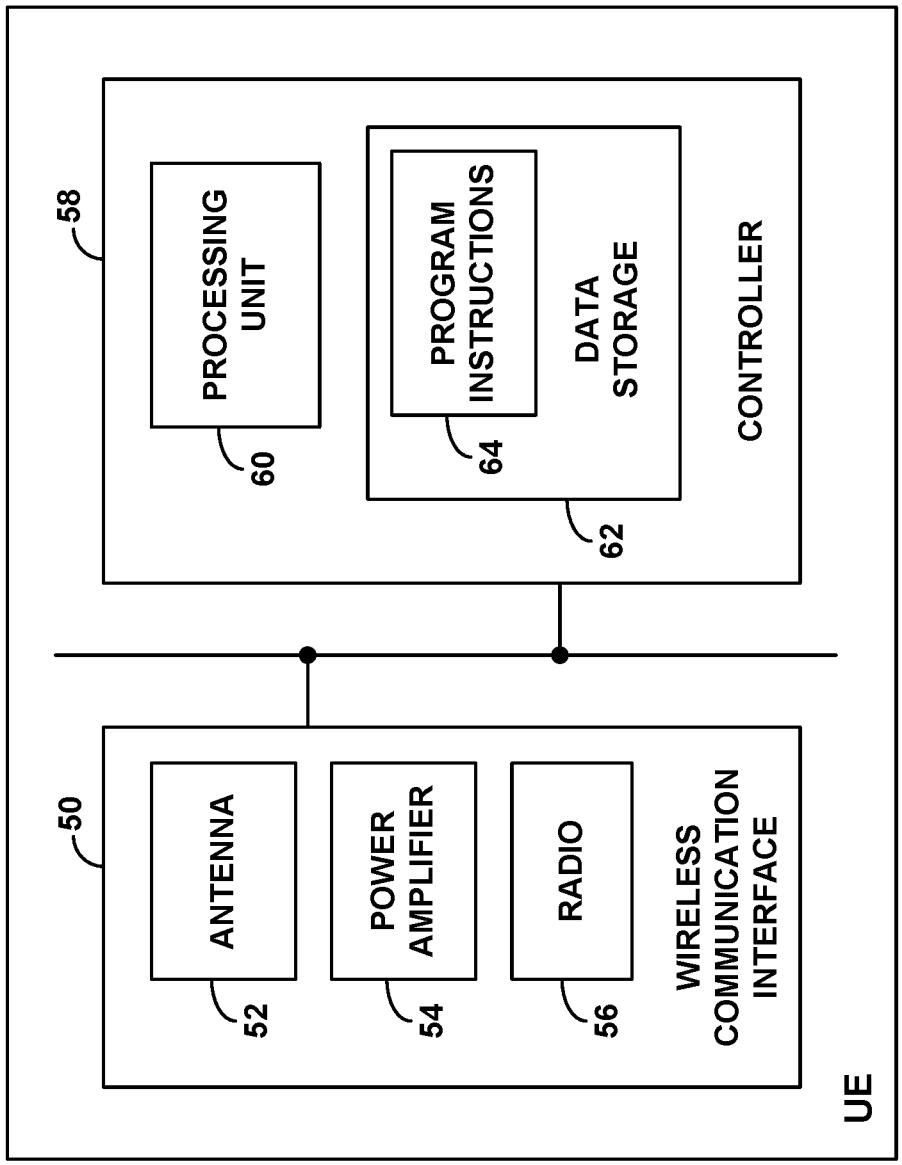
FIG. 5 is a simplified block diagram of a UE operable in accordance with the disclosure.

Finally, FIG. 5 is a simplified block diagram of an example UE configured to control whether the UE will be served by a base station's cell when the UE is within coverage of the cell, where the cell operates with a TDD configuration defining a specific sequence of uplink and downlink subframes.

As shown in FIG. 5, the example UE includes a wireless communication interface 50 including an antenna 52, power amplifier 54, and radio 56, cooperatively configured to engage in air interface communication, including uplink transmission. Further, the UE includes a controller 58 configured to carry out various operations described herein. For instance, the controller could be configured to determine, based on a current geographic location of the UE, a set of one or more TDD configurations supported by the UE, where each TDD configuration of the determined set defines a respective sequence of uplink and downlink subframes. And the controller could be configured to control whether the UE will be served by the cell, with the controlling of whether the UE will be served by the cell being based on whether the TDD configuration of the cell is within the determined set of one or more TDD configurations, such that the UE will be served by the cell only if the TDD configuration of the cell is within the determined set of one or more TDD configurations.

In practice, the controller could take various forms and could be integrated in whole or in part with the wireless communication interface. For example, the controller could include a processing unit 60 (e.g., one or more microprocessors or specialized processors), non-transitory data storage 62 (e.g., one or more volatile and/or non-volatile storage components, such as magnetic, optical, and/or flash storage), and program instructions 64 stored in the data storage and executable by the processing unit(s) to carry out the indicated operations. Further, the data storage could hold reference data, such as UE-provisioning data indicating a configured maximum transmission power level for controlling the power amplifier 54 and thus the UE's uplink transmission power, and correlation data to facilitate implementation as discussed above.

In line with the discussion above, the UE may thus refer to the reference data to determine the set of one or more TDD configurations supported by the UE based on the current geographic location of the UE. Further, the UE may determine its current geographic location (e.g., per the MCC broadcast in the cell) and could use its determined current geographic location as a basis to determine the set of one or more TDD configurations supported by the UE. In addition, the cell could operate in a frequency band, the data storage could further correlate supported TDD configurations with frequency band as discussed above, and the UE could use the frequency band as a further basis to determine the set of one or more TDD configurations supported by the UE.

In addition, the cell could broadcast an indication of TDD configuration of the cell, and the UE's controller could be further configured to determine the TDD configuration of the cell based on the broadcast indication of the TDD configuration of the cell. And if the UE determines that the TDD configuration of the cell is not within the determined set of one or more TDD configurations supported by the UE, the UE's controller could cause the UE to not be served by the cell, and perhaps to instead be served by another cell such as a second best cell for instance.

Exemplary embodiments have been described above. Those skilled in the art will understand, however, that changes and modifications may be made to these embodiments without departing from the true scope and spirit of the invention.

We claim:

1. A method for controlling operation of a user equipment device (UE) when the UE is within coverage of a base station's cell, wherein the cell operates with a time-division-duplex (TDD) configuration defining a specific sequence of uplink and downlink subframes, the method comprising:
   determining by the UE, based on current geographic location of the UE, a set of one or more TDD configurations supported by the UE, wherein each TDD configuration of the determined set defines a respective sequence of uplink and downlink subframes; and
   controlling by the UE whether the UE will be served by the cell, wherein the controlling is based on whether the TDD configuration of the cell is within the determined set of one or more TDD configurations, wherein the UE will be served by the cell only if the TDD configuration of the cell is within the determined set of one or more TDD configurations.

2. The method of claim 1, wherein the UE is provisioned with data that correlates each of various geographic locations with a respective set of one or more TDD configurations supported by the UE, and wherein determining the set of one or more TDD configurations supported by the UE based on the current geographic location of the UE is based on reference to the data.

3. The method of claim 1, further comprising determining by the UE the current geographic location of the UE, wherein determining the set of one or more TDD configurations supported by the UE is based on the determined current geographic location of the UE.

4. The method of claim 3, wherein the determined current geographic location comprises a country, wherein the base station broadcasts in the cell a mobile country code (MCC) indicating the country, and wherein determining the current geographic location comprises reading the MCC broadcast by the base station in the cell.

5. The method of claim 1, wherein the cell operates in a frequency band, and wherein determining the set of one or more TDD configurations supported by the UE is based further on the frequency band in which cell operates.

6. The method of claim 5, wherein the UE is provisioned with data that specifies, respectively for each of various locations, a set of one or more TDD configurations supported by the UE respectively for each of one or more frequency bands, and wherein determining the set of one or more TDD configurations supported by the UE based on the current geographic location of the UE and based further on the frequency band in which the cell operates is based on reference to the data.

7. The method of claim 1, wherein the base station broadcasts in the cell an indication of the TDD configuration of the cell, the method further comprising determining by the UE the TDD configuration of the cell by reading the broadcast indication of the TDD configuration of the cell.

8. The method of claim 1, wherein controlling whether the UE will be served by the cell, based on whether the TDD configuration of the cell is within the determined set of one or more TDD configurations, comprises:
responsive to the TDD configuration of the cell not being within the determined set of one or more TDD configurations, forgoing being served by the cell.

9. The method of claim 8, wherein controlling whether the UE will be served by the cell, based on whether the TDD configuration of the cell is within the determined set of one or more TDD configurations, further comprises:
determining that the TDD configuration of the cell is not within the determined set of one or more TDD configurations; and
responsive to determining that the TDD configuration of the cell is not within the determined set of one or more TDD configurations, opting to be served by another cell instead.

10. A user equipment device (UE) configured to control whether the UE will be served by a base station's cell when the UE is within coverage of the cell, wherein the cell operates with a time-division-duplex (TDD) configuration defining a specific sequence of uplink and downlink subframes, the UE comprising:
a wireless communication interface including an antenna and radio, configured to engage in air interface communication; and
a controller, wherein the controller is configured to (i) determine, based on a current geographic location of the UE, a set of one or more TDD configurations supported by the UE, wherein each TDD configuration of the determined set defines a respective sequence of uplink and downlink subframes, and (ii) control whether the UE will be served by the cell, wherein controlling whether the UE will be served by the cell is based on whether the TDD configuration of the cell is within the determined set of one or more TDD configurations, wherein the UE will be served by the cell only if the TDD configuration of the cell is within the determined set of one or more TDD configurations.

11. The UE of claim 10, wherein the controller comprises a processing unit, non-transitory data storage, and program instructions stored in the data storage and executable by the processing unit to carry out the determining and the controlling.

12. The UE of claim 10, further comprising data storage, wherein the data storage holds data that correlates each of various geographic locations with a respective set of one or more TDD configurations supported by the UE, and wherein determining the set of one or more TDD configurations supported by the UE based on the current geographic location of the UE is based on reference to the data.

13. The UE of claim 10, wherein the UE is configured to determine the current geographic location of the UE, wherein determining the set of one or more TDD configurations supported by the UE is based on the determined current geographic location of the UE.

14. The UE of claim 13, wherein the determined current geographic location comprises a country, wherein the base station broadcasts in the cell a mobile country code (MCC) indicating the country, and wherein determining the current geographic location comprises reading the MCC broadcast by the base station in the cell.

15. The UE of claim 10, wherein the cell operates in a frequency band, and wherein determining the set of one or more TDD configurations supported by the UE is based further on the frequency band in which cell operates.

16. The UE of claim 15, further comprising data storage, wherein the data storage holds data that specifies, respectively for each of various locations, a set of one or more TDD configurations supported by the UE respectively for each of one or more frequency bands, and wherein determining the set of one or more TDD configurations supported by the UE based on the current geographic location of the UE and based further on the frequency band in which the cell operates is based on reference to the data.

17. The UE of claim 10, wherein the cell broadcasts an indication of the TDD configuration of the cell, and wherein the controller is further configured to determine the TDD configuration of the cell based on the broadcast indication of the TDD configuration of the cell.

18. The UE of claim 10 wherein controlling whether the UE will be served by the cell, based on whether the TDD configuration of the cell is within the determined set of one or more TDD configurations, comprises:
responsive to the TDD configuration of the cell not being within the determined set of one or more TDD configurations, causing the UE to not be served by the cell.

19. The UE of claim 18, wherein controlling whether the UE will be served by the cell, based on whether the TDD configuration of the cell is within the determined set of one or more TDD configurations, further comprises:
determining that the TDD configuration of the cell is not within the determined set of one or more TDD configurations; and
responsive to determining that the TDD configuration of the cell is not within the determined set of one or more TDD configurations, causing the UE to be served by another cell instead.

20. A method comprising:
provisioning a user equipment device (UE) with data that correlates each of various geographic locations with a respective set of one or more time-division-duplex (TDD) configurations supported by the UE in the geographic location, wherein each TDD configuration defines a respective sequence uplink and downlink subframes, and wherein the data is based on (i) uplink transmission power of the UE and (ii) uplink transmission power permitted in the location; and
configuring the UE (a) to use the data as a basis to determine, based on a current geographic location of the UE, a set of one or more TDD configurations supported by the UE, (b) to determine a TDD configuration of a base station's cell in whose coverage the UE is positioned, and (c) to control whether the UE will be served by the cell, based on whether the determined TDD configuration of the cell is within the determined set of one or more TDD configurations supported by the UE.

\* \* \* \* \*